US011032346B2

(12) United States Patent
Mueller et al.

(10) Patent No.: US 11,032,346 B2
(45) Date of Patent: Jun. 8, 2021

(54) CLIENT, LIVE-STREAMING SERVER AND DATA STREAM USING AN INFORMATION ON A CURRENT SEGMENT OF A SEQUENCE OF SEGMENTS

(71) Applicant: bitmovin GmbH, Klagenfurt (AT)

(72) Inventors: Christopher Mueller, Villach (AT); Reinhard Grandl, Maria Rain (AT); Daniel Weinberger, St. Georgen (AT)

(73) Assignee: bitmovin GmbH, Klagenfurt (AT)

( * ) Notice: Subject to any disclaimer, the term of this patent is extended or adjusted under 35 U.S.C. 154(b) by 0 days.

(21) Appl. No.: 15/672,218

(22) Filed: Aug. 8, 2017

(65) Prior Publication Data
US 2017/0339207 A1 Nov. 23, 2017

Related U.S. Application Data

(63) Continuation of application No. PCT/EP2016/052615, filed on Feb. 8, 2016.
(Continued)

(51) Int. Cl.
*H04L 29/06* (2006.01)
*H04N 21/845* (2011.01)
(Continued)

(52) U.S. Cl.
CPC ........ *H04L 65/608* (2013.01); *H04L 65/4084* (2013.01); *H04L 67/02* (2013.01);
(Continued)

(58) Field of Classification Search
CPC ... H04L 65/608; H04L 65/4084; H04L 67/02; H04N 21/23439; H04N 21/26258; H04N 21/6581; H04N 21/8456
See application file for complete search history.

(56) References Cited

U.S. PATENT DOCUMENTS

| 2011/0231519 A1* | 9/2011 | Luby | H04N 21/2662 |
| | | | 709/219 |
| 2013/0091251 A1* | 4/2013 | Walker | H04N 21/6125 |
| | | | 709/219 |

(Continued)

FOREIGN PATENT DOCUMENTS

WO 2014096463 A1 6/2014

OTHER PUBLICATIONS

"Telefon AB LM Ericsson, ST-Ericsson SA", Media Presentation Description in http Streaming; 3GPP Draft; S-4-100080-MPD, 3rd Generation Partnership Project (3GPP), Mobile Competence Centre; 650, Routes Des Lucioles; F-06921 Sophia-Antipolis Cedex; France; vol. SA WG4; XP050437773, Jan. 20, 2010, pp. 4, 6-10.
(Continued)

*Primary Examiner* — Christopher B Robinson
(74) *Attorney, Agent, or Firm* — Michael A. Glenn; Perkins Coie LLP

(57) ABSTRACT

A client configured to retrieve a live-stream media content is shown. The client is configured to receive from a live-streaming server a media presentation description (MPD) describing live-stream media content composed of a sequence of segments and an information on a current segment of the sequence of segments. The client is further configured to commence retrieving the live-stream media content from the live-streaming server from a predetermined segment of the sequence of segments onwards, which the client determined based on the information.

12 Claims, 6 Drawing Sheets

Related U.S. Application Data

(60) Provisional application No. 62/113,615, filed on Feb. 9, 2015.

(51) Int. Cl.
  *H04N 21/262*     (2011.01)
  *H04N 21/2343*    (2011.01)
  *H04N 21/658*     (2011.01)
  *H04L 29/08*      (2006.01)

(52) U.S. Cl.
  CPC . *H04N 21/23439* (2013.01); *H04N 21/26258* (2013.01); *H04N 21/6581* (2013.01); *H04N 21/8456* (2013.01); *H04L 65/602* (2013.01)

(56) References Cited

U.S. PATENT DOCUMENTS

2014/0164575 A1\* 6/2014 Wang ............... H04L 67/02 709/219
2015/0195327 A1\* 7/2015 Bouazizi ............... H04L 65/608 709/219
2016/0088050 A1\* 3/2016 Einarsson ........... H04L 65/4084 709/231

OTHER PUBLICATIONS

Mueller, Christopher et al., "Session Mobility for DASH: Input to the EE on AMP", 96. MPEG Meeting; Mar. 21, 2011 to Mar. 25, 2014; Geneva; (Motion Picture Expert Group or ISO/IEC JTC1/SC29/WG11); No. m20080, Mar. 16, 2011, XP030048647;, Mar. 16, 2011, the whole document.

Stockhammer, Thomas, "Guidelines on Live Streaming", 103. MPEG Meeting; Jan. 21, 2013 to Jan. 25, 2013; Geneva; (Motion Picture Expert Group or ISO/IEC JTC1/SC29/WG11); No. m28195; EP030056742, Jan. 18, 2013, pp. 2, 3, 4, 6; Fig. 1, p. 7.

Timmerer, Christian et al., "Live Edge Hinting for MPEG-DASH", 111. MPEG Meeting; Feb. 6, 2015 to Feb. 20, 2015; Geneva; (Motion Picture Expert Group or ISO/IEC JTC1/SC29/WG11), No. m35935, Feb. 10, 2015; XP030064303, Feb. 10, 2015, whole document.

\* cited by examiner

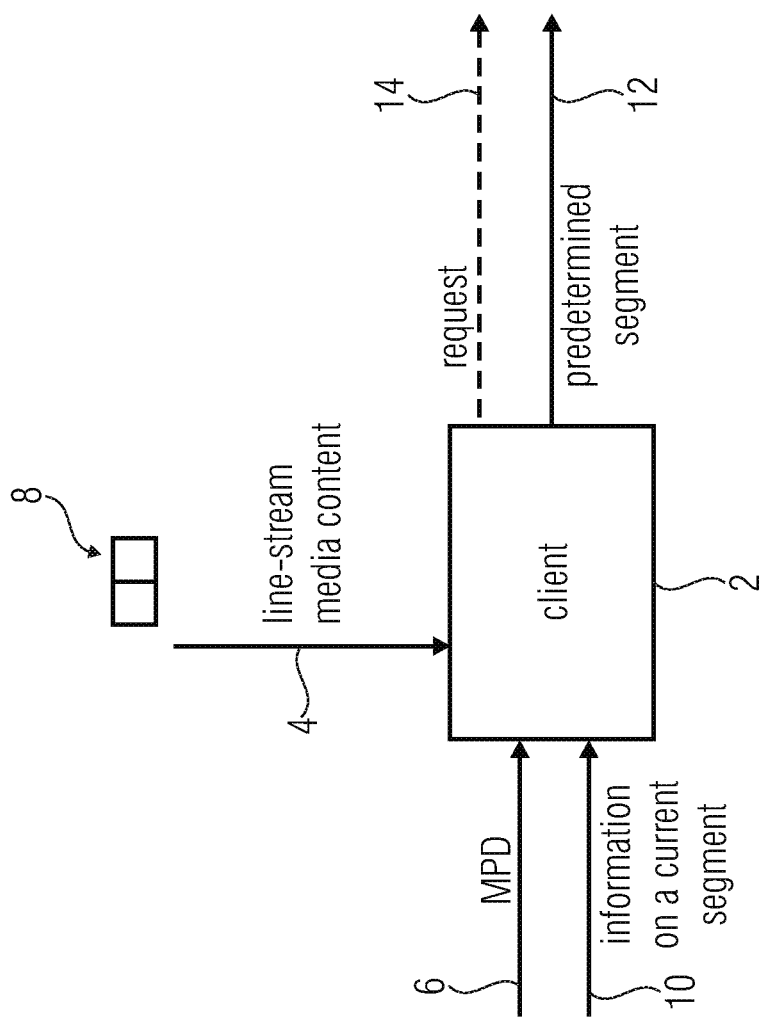

```xml
<MPD xmlns:xsi="http://www.w3.org/2001/XMLSchema-instance"
xmlns="urn:mpeg:dash:schema:mpd:2011"
xsi:schemaLocation="urn:mpeg:dash:schema:mpd:2011
http://standards.iso.org/ittf/PubliclyAvailableStandards/MPEG-
DASH_schema_files/DASH-MPD.xsd" type="dynamic"
availabilityStartTime="2015-01-02T10:54:46Z" publishTime="2015-01-
02T10:54:46Z" timeShiftBufferDepth="PT10S" minimumUpdatePeriod="PT50S"
maxSegmentDuration="PT5S" minBufferTime="PT1S"
profiles="urn:mpeg:dash:profile:isoff-live:2011,urn:com:dashif:dash264">
  <BaseURL>http://example.com/dash/</BaseURL>
  <Period id="1" start="PT0S">
    <AdaptationSet group="1" mimeType="audio/mp4" minBandwidth="128000"
    maxBandwidth="128000" segmentAlignment="true">
      <Representation id="128kbit" bandwidth="128000" codecs="mp4a.40.2"
      audioSamplingRate="44100">
        <SegmentTemplate duration="4" media="250k/bitcodin-$Number$.m4a"
        initialization="250k/bitcodin-init.m4a" startNumber="1"
        liveEdgeNumber="30127"/>
      </Representation>
    </AdaptationSet>
    <AdaptationSet group="2" mimeType="video/mp4" segmentAlignment="true">
      <Representation id="250kbps_240p" frameRate="24" bandwidth="250000"
      codecs="avc1.42c00d" width="426" height="240">
        <SegmentTemplate duration="4" media="250k/bitcodin-$Number$.m4v"
        initialization="250k/bitcodin-init.m4v" startNumber="1"
        liveEdgeNumber="30127"/>
      </Representation>
      <Representation id="500kbps_360p" frameRate="24" bandwidth="500000"
      codecs="avc1.42c00d" width="640" height="360">
        <SegmentTemplate duration="4" media="500k/bitcodin-$Number$.m4v"
        initialization="500k/bitcodin-init.m4v" startNumber="1"
        liveEdgeNumber="30127"/>
      </Representation>
    </AdaptationSet>
  </Period>
</MPD>
```

Fig. 2

CLIENT, LIVE-STREAMING SERVER AND DATA STREAM USING AN INFORMATION ON A CURRENT SEGMENT OF A SEQUENCE OF SEGMENTS

CROSS-REFERENCE TO RELATED APPLICATIONS

This application is a continuation of copending International Application No. PCT/EP2016/052615, filed Feb. 8, 2016, which is incorporated herein by reference in its entirety, and additionally claims priority from U.S. Application 62/113,615, filed Feb. 9, 2015, which is also incorporated herein by reference in its entirety.

The present invention relates to a client, a live-streaming server, and a data stream using an information on a current segment of a sequence of segments. Embodiments show a device or a method for enabling low start-up delay for adaptive streaming using SegmentTemplate based MPEG-DASH livestreaming.

BACKGROUND OF THE INVENTION

Increasing start-up times in online video streaming significantly decrease the quality of experience (QoE) for users. One issue for the increasing start-up times is locating the currently distributed or played segment in the video stream. Conventional live-edge detection methods enabling the client to request the (correct) currently distributed segment suffer from a unsynchronized or a unaligned system clock of the client and the live-streaming server. The conventional live-edge detection method calculates a starting point based on an absolute start time of the live-stream, the current time, and the average size of each segment of the live-stream. A further issue may be varying sizes of the segments wherein a client may only estimate a length of each segment using an average of the length. Based on the, most likely incorrectly estimated, segment, the client calculates a new starting point by searching the timeline in both directions unless the correct currently distributed or played segment is found. Moreover, the searching algorithm works based on a trial and error approach, meaning that the client requests the calculated segment. For a request, the client may form a specific URL (Uniform Resource Locator) indicating the server to request the estimated segment. If the requested segment is not in the range of a buffer size, the server may return a (e.g. 404) error since the URL does not lead to a valid webpage or source. This is an indication to the client to request a further segment. Obviously, this trial and error requesting further increases start-up times of a live-stream video.

SUMMARY

An embodiment may have a client configured to retrieve a live-stream media content, wherein the client is configured to receive from a live-streaming server a media presentation description (MPD) describing live-stream media content composed of a sequence of segments and an information on a current segment of the sequence of segments, wherein the client is further configured to commence retrieving the live-stream media content from the live-streaming server from a predetermined segment of the sequence of segments onwards which the client determined based on the information.

Another embodiment may have a live-streaming server configured for providing a media presentation description (MPD) describing live-stream media content composed of a sequence of segments and further configured for providing an information on a current segment of the sequence of segments responsive to one request of a client.

Another embodiment may have a data stream having a media presentation description (MPD) describing live-stream media content composed of a sequence of segments, the MPD having an information on a current segment of the sequence of segments.

According to another embodiment, a method to retrieve a live-stream media content with a client may have the steps of: receiving from a live-streaming server a media presentation description (MPD) describing live-stream media content composed of a sequence of segments and an information on a current segment of the sequence of segments; and commence retrieving the live-stream media content from the live-streaming server from a current segment of the sequence of segments onwards which the client determined based on the information.

According to another embodiment, a method for operating a live-streaming server may have the steps of: providing a media presentation description (MPD) describing live-stream media content composed of a sequence of segments; and providing an information on a current segment of the sequence of segments responsive to one request of a client.

Another embodiment may have a non-transitory digital storage medium having a computer program stored thereon to perform the method to retrieve a live-stream media content with a client, the method having the steps of: receiving from a live-streaming server a media presentation description (MPD) describing live-stream media content composed of a sequence of segments and an information on a current segment of the sequence of segments; and commence retrieving the live-stream media content from the live-streaming server from a current segment of the sequence of segments onwards which the client determined based on the information, when said computer program is run by a computer.

Another embodiment may have a non-transitory digital storage medium having a computer program stored thereon to perform the method for operating a live-streaming server, the method having the steps of: providing a media presentation description (MPD) describing live-stream media content composed of a sequence of segments; and providing an information on a current segment of the sequence of segments responsive to one request of a client, when said computer program is run by a computer.

The present invention is based on the finding that an indication of a currently distributed segment of a live-stream is advantageous for enabling a client to improve start-up or loading times of the live-stream. Based on this indication, the client may directly request the correct current segment, which is currently distributed by the live-streaming server. In other words, the client does not need to calculate the current segment based on blurry or fuzzy variables as described above, but receives a direct reference to the current segment as indicated by the live-streaming server. Therefore, cumbersome brute force or trial and error methods to find the correct segment are reduced up to zero. However, dependent on for example the streaming connection and/or the computational power of the client, a small delay may occur during the consecutive requests of the client to the server. A first request of the consecutive requests may be the request to transmit the indication of the current segment and a second request of the consecutive requests may be the request to to transmit the current segment. Moreover, caused by this delay, a small number of further segments, such as for example one or two more segments have to be requested for. This may be more likely if the duration of a segment is short and the size of a buffer is small.

However, it is most likely to directly access the currently distributed segment, or at least a segment nearby, such as the previous segment, which may be most likely still stored in the buffer. Therefore, there is no or only a small delay from the distributed live-stream media content to the video displayed at the consumer. In known methods, the client may estimate a segment that is at the end of the buffer. This segment, and the further segments, may be played anyway, having however a maximum delay of the buffer size. This may decrease the user experience, if e.g. during a sports live stream, current scores are distributed to the user through other communication channels before the scene resulting in the scoring is displayed at the users screen or monitor. This scenario does not occur with the proposed concept.

According to embodiments, the client may be configured to retrieve a live-stream media content, such as a live-stream video (content). For example, MPEG-DASH may be used for the retrieval. The client is configured to receive from a live-streaming server a media presentation description (MPD) describing the live-stream media content composed of a sequence of segments and an information on a current segment of the sequence of segments. For example, the MPD may inform the client on representations at which the live-stream media content is available at the live-streaming server and characteristics of the representations such as the bitrate of the representation, representation inter-dependencies and/or a template indicating or signaling a computation rule for computing indices of the segments of the representation. In other words, the URL may comprise a base string or a base URL referring to the addressed representation and, for further specification of each segment, a pointer or link to the current segment. Therefore, the final URL may be a concatenation of the base string and the pointer such that a unique URL is formed for each segment of a representation. The client is further configured to commence retrieving the live-stream media content from the live-streaming server from a predetermined segment of the sequence of segments onwards, which the client determined based on the information. Therefore, the client may generate a unique index such as the (unique) URL for each segment to be retrieved from the server. A request to the server to provide the current segment may be performed by calling up the unique URL. The client may derive the segment template signaling a computation rule for computing unique indices of the segments of the representation from the MPD.

The live-stream media content may comprise one or more representations, wherein a representation may comprise the live-stream media content at different bitrates. Each representation may have different sizes of segments. Therefore, it is advantageous to provide the actual index of the current segment to the client to enable a direct access to the segment in the current representation. In other words, while the client determines the suitable representation with respect to the processing speed and the internet or streaming connection, the information of the currently distributed segment is present and up to date with respect to each representation, e.g. in the MPD or out of band. In contrast, known methods may determine the suitable representation, access the MPD to derive the described information (such as starting time, average segment length) to determine with respect to the current time, the correct segment. Therefore, even the calculation itself induces a delay in the video stream which is greater than the delay of the proposed concept.

According to further embodiments, the information on the current segment of the sequence of segments may indicate the unique index of the current segment. In other words, segments may be media segments comprising the actual media files that the (DASH) client receives or plays, e.g. by playing them back-to-back as if they were the same file. Media segment locations can be described using a template (SegmentTemplate), wherein a representation may be addressed using a base URL and the actual segment may be addressed by appending a suffix or explicit destination to the base URL may be a URL to a (specific) representation. However, using the indexing is advantageous since a streaming server already knows indices of the segments of a video stream such that the indication of the same from the streaming server is easy to implement and causes a huge improvement in the user experience. Furthermore, for example to maintain a backwards compatibility, the segment template may indicate a live streaming start-time of the sequence of segments and a mean temporal length of the segments of the sequence of segments. This may be an absolute timing data such as current timestamps provided by the server. Moreover, the information on the current segment may additionally provide a relative position of the current segment in the live-stream media content and the client may be configured to determine the current segment of the sequence of segments with an improved precision compared to the absolute position.

Further embodiments show a live-streaming server configured for providing a media presentation description (MPD) describing live-stream media content composed of a sequence of segments and further configured for providing an information on a current segment of the sequence of segments responsive to one request of a client. Accordingly, the server may provide the index of the currently distributed segment of the live video stream upon request of a client. Based on the request, the server may provide the information on the current segment, for example in the MPD or out of band.

Moreover, according to further embodiments, a corresponding data stream may comprise a media presentation description (MPD) describing live-stream media content composed of a sequence of segments, the MPD comprising an information on a current segment of the sequence of segments.

BRIEF DESCRIPTION OF THE DRAWINGS

Embodiments of the present invention will be detailed subsequently referring to the appended drawings, in which:

FIG. 1 shows a schematic block diagram of a client configured to retrieve a live-stream media content;

FIG. 2 shows an exemplary syntax of a MPD comprising information on a current segment of a live-stream media content;

DETAILED DESCRIPTION OF THE INVENTION

Figure 3:
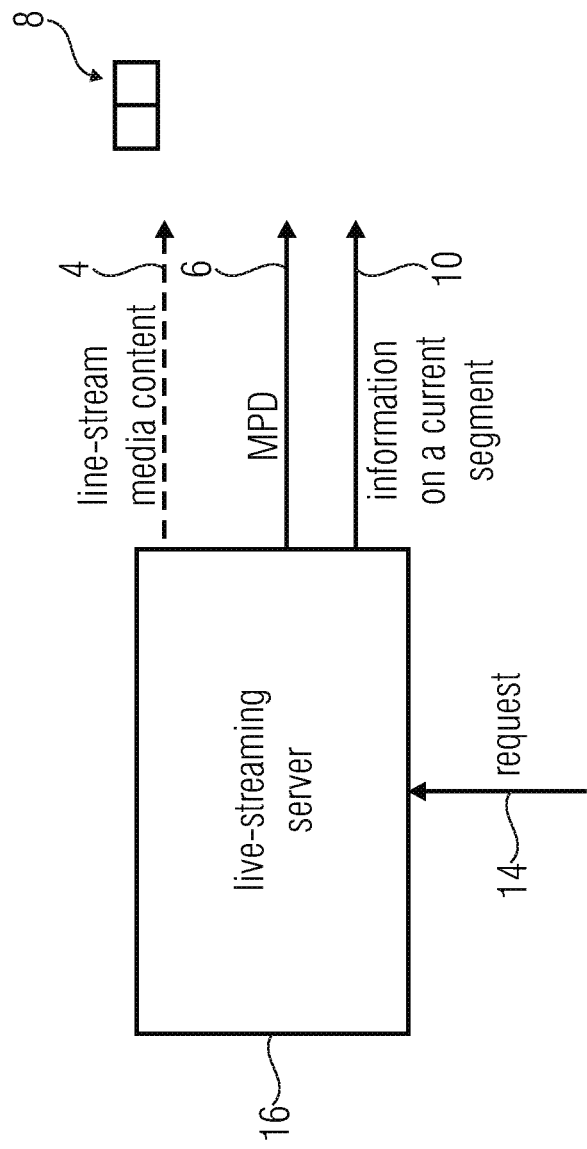
FIG. 3 shows a schematic block diagram of a live-streaming server.

In the following, embodiments of the invention will be described in further detail. Elements shown in the respective figures having the same or a similar functionality will have associated therewith the same reference signs.

FIG. 1 shows an exemplary block diagram of a client 2 configured to retrieve a live-stream media content 4. The client 2 is configured to receive from a live-streaming server a media presentation description (MPD) 6 describing live-stream media content 4 composed of a sequence of segments 8 and an information 10 on a current segment of the sequence of segments 8. The client is further configured to commence retrieving the live-stream media content 4 from the live-streaming server from a predetermined segment of the sequence of segments 8 onwards, which the client 2 determined based on the information 10.

The client may be a personal computer or a further data processor being able to receive the live-stream media content 4. The live-stream media content 4 may be a (previously) encoded video stream, for example to view or watch a current TV show distributed via such a live-stream. The MPD may be a manifest of the dynamic adaptive streaming over HTTP (DASH), for example an XML-encoded index file defining codecs and URLs of segments. Therefore, the segments may be HTTP-based file segments or media segments. More specifically, the client may be configured to derive from the MPD a segment template signaling a computation rule for computing unique indices of the segments of the representation.

The information on the current segment of the sequence of segments may be, according to an embodiment, an index of the current segment. Therefore, each segment may comprise such a unique index indicating a position of the current segment in the sequence of segments or the live-stream media content. The index may indicate a relative position of the current segment in the sequence of segments. The (relative) position may be relative to a first segment of the sequence of segments e.g. derived using incremental counting of the indices. Therefore, the index may be a suffix to a URL to indicate the current segment in a representation identified by the URL. According to further embodiments, the index may be the complete specific or unique URL.

Moreover, the client 2 may determine the information on the current segment, such as the index of the current segment, which may be the predetermined segment 12. Usually, the predetermined segment and the current segment are the same or at least, the predetermined segment is still in the buffer such that the live-stream media content may start immediately after the request of the client. However, due to an advancing or progression of time between the request 14 of the client to the live-streaming server to provide the information on the current segment and the request 14 of the client to the live-streaming server to provide the (predetermined) segment referenced by the information on the current segment, this segment may no longer be in the buffer. Therefore, the segment of the live-stream media content currently delivered by the live-streaming server is a different segment when compared to the predetermined segment 12. In this case, the client may request further segments starting from the predetermined segment until the currently distributed segment is reached. Nonetheless, this case is extremely seldom since the processing of the distributed information on the current segment is extremely quick or fast.

However, according to further embodiments, the client may calculate or predict, e.g. based on an intermediate or medium length or duration of each segment and the time passed between the first request to receive the information on the current segment and the second request to retrieve the predetermined segment, a modified predetermined segment that may be equal to the predetermined segment or being greater than the predetermined segment. In other words, the client may compensate its processing time during receiving the information on the currently distributed segment and the request for retrieving the live-stream media content. Therefore, a future segment with respect to the calculated segment may be requested. This is advantageous, since even the small delay of the proposed concept may be compensated.

Moreover, the MPD 6 may further comprise an absolute timing data of the current segment indicating an absolute position of the current segment in the sequence of segments. This absolute timing data may be an absolute start time of the live-stream in combination with a maximum or average segment duration. However, this indication is comparatively unprecise, since the system clock of the server and the system clock of the client may be unsynchronized and therefore indicate a different current time. Furthermore, the temporal length or duration of each segment may vary within the sequence of segments and therefore a precise prediction is difficult. However, this absolute timing data ensures the backwards compatibility. Furthermore, the information on the current segment is additionally provided to indicate a relative position of the current segment in the live-stream media content. Therefore, the client may be configured to determine the current segment of the sequence of segments with an improved precision compared to the absolute position. The information on the current segment, however, may be provided in the MPD, e.g. in a segment template, or out of band.

A further advantage of the described concept is the fact that different representations within the live-stream media content may have different current indices or numbers of the segment. A representation may be a (DASH) terminology for a specific encoding of a content item. The live-stream may comprise multiple representations, wherein each representation provides the live-stream media content at different bitrates. In other words, the live-stream media content at different bitrates may have different sizes of segments such that it is even more advantageous to provide the actual index of the current segment to the client in order to enable a direct access to said segment.

FIG. 2 shows an exemplary syntax of the MPD according to an embodiment. In the general part of the MPD, the tag "availabilityStartTime" in connection with the tag "maxSegmentDuration" may enable the client to calculate the current segment based on the absolute timing data as described above with respect to the known method. Furthermore, the buffer may be specified. However, having a large buffer, a running live-stream does not guarantee that the currently viewed video is live and therefore does not show a delay. This is a further advantage of the proposed concept. The currently distributed segment is requested by the client and not a past segment which is still present in the buffer but which may be tens of seconds or minutes delayed. Moreover, the MPD shows the segment template 11 and the base URL 13. An exemplary URL to derive the current segment may be, based on the MPD indicated in FIG. 2, http://example.com/dash/30127.

In the described concept, which may be the server assisted live edge hinting (SALEH), the server signals the number of the actual segment that is written in the manifest (such as the MPD) using an attribute, element, tag, etc., using, for example, the "liveEdgeNumber" attribute as highlighted by underlining in FIG. 2. Using SALEH, the start-up delay, introduced by live edge calculation and/or search, decreases to zero. This mechanism could be used for all number based adaptive streaming systems.

FIG. 3 shows a schematic representation of a live-streaming server 16 for providing a media presentation description (MPD) 6 describing live-stream media content 4 composed of a sequence of segments 8 and further configured for providing an information 10 on a current segment of the sequence of segments responsive to one request 14 of a client 2. In other words, the server may be configured to provide the information on the current segment, for example in the MPD or out of band, to indicate to one or more clients a current position of the distributed live-stream. Since each segment of the sequence of segments may be indicated by a unique index, the information on the current segment of the sequence of segments may be the index of the predetermined segment such that a relative position of the predetermined segment in the sequence of segments is indicated by the index. The server may provide the life-stream media content via HTTP for example using the DASH standard, such that the live-streaming server may be configured to provide the live-stream media content using MPEG-DASH. Moreover, the live-streaming server may provide in the MPD, a segment template signaling a computation rule for computing unique indices of the segments of the representation. Additionally, e.g. to obtain backwards compatibility, the segment template may indicate a live streaming start-time of the sequence of segments and a mean temporal length of the segments of the sequence of segments.

Figure 4:
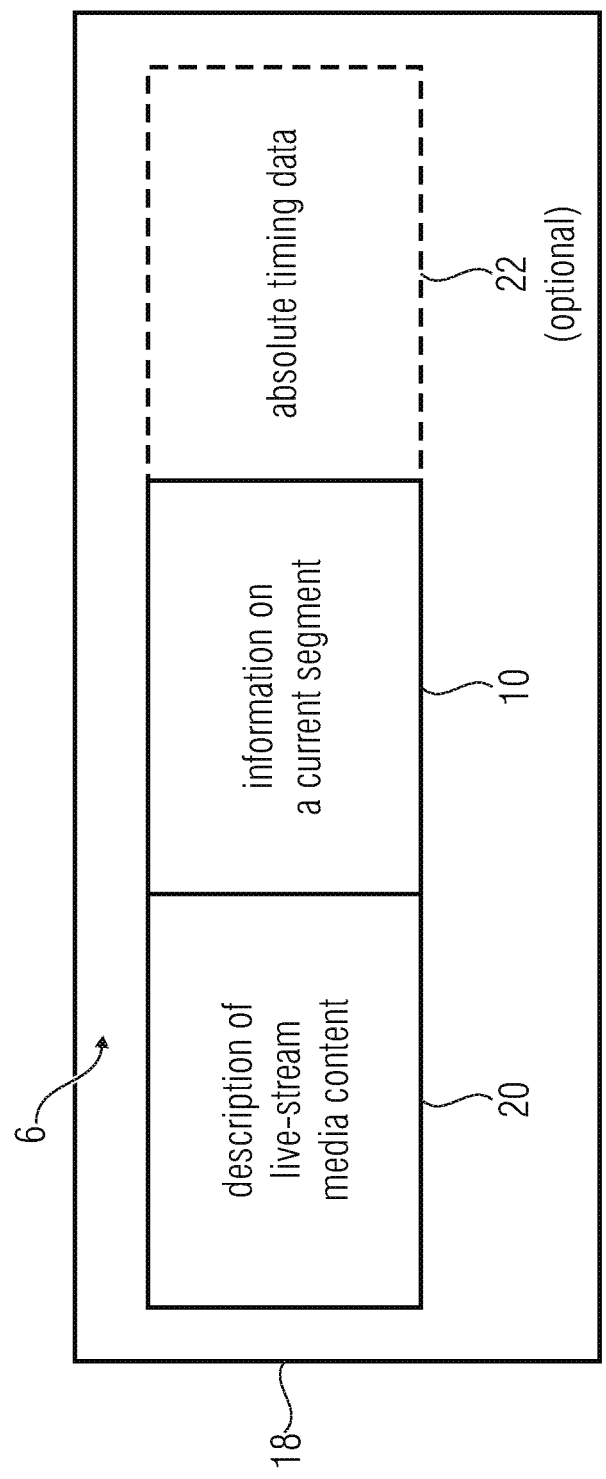
FIG. 4 shows a schematic block diagram of a data stream comprising a media presentation description according to embodiments.

FIG. 4 shows a schematic block diagram of the data stream 18 comprising the media presentation description 6. The media presentation description comprises a description of live-stream media content 20 composed of a sequence of segments and an information 10 on a current segment of the sequence of segments. The live-stream media content may be provided or transmitted using MPEG-DASH. Moreover, the data stream may comprise a segment template signaling a computation rule for computing unique indices of the segments of the representation in the MPD. The information on the current segment of the sequence of segments may be indicates by the unique index of the current segment. Moreover, the segment template may additionally indicate a live streaming start-time of the sequence of segments and a mean temporal length of the segments of the sequence of segments.

According to further embodiments, the MPD may optionally comprise an absolute timing data 22 of the current segment indicating an absolute position of the current segment in the sequence of segments. However, the information on the current segment additionally provides a relative position of the current segment in the live-stream media content.

Figure 5:
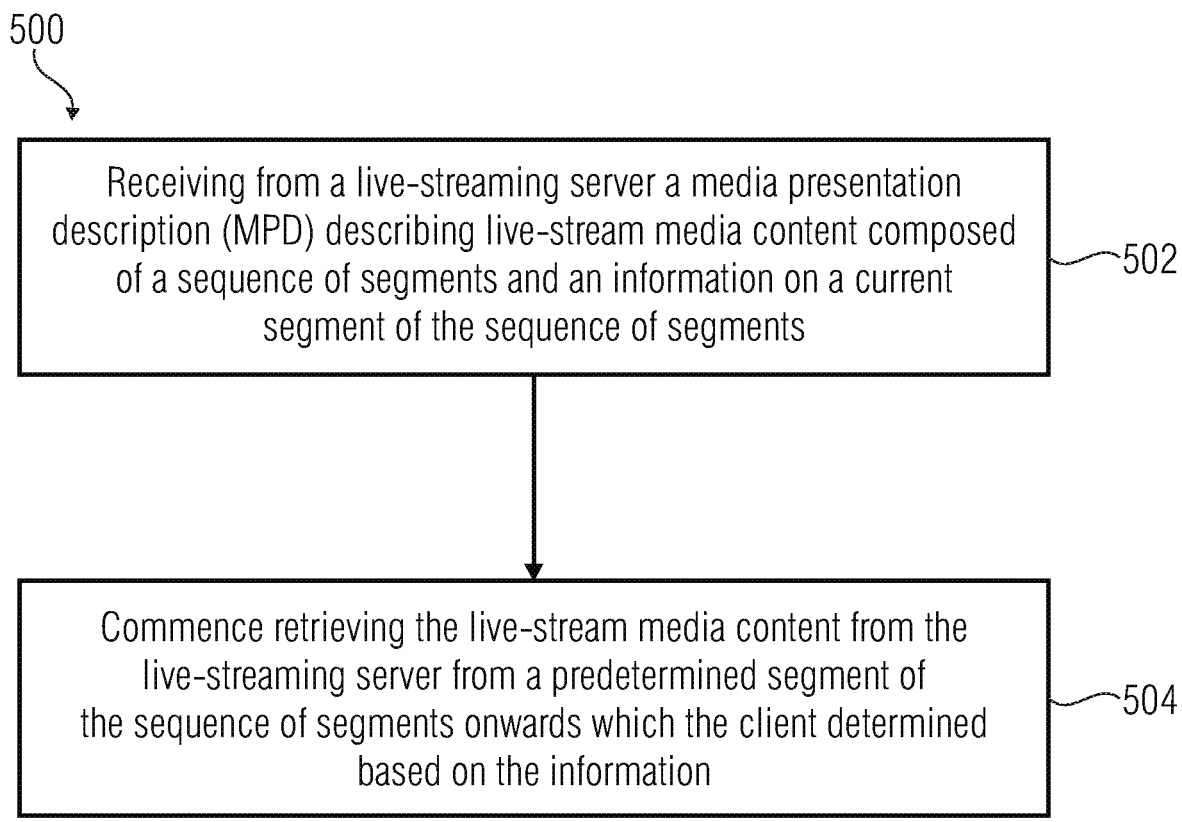
FIG. 5 shows a schematic block diagram of a method to retrieve a live-stream media content with a client.

FIG. 5 shows a schematic block diagram of a method 500 to retrieve a live-stream media content with a client. The method 500 comprises a step 502 of receiving from a live-streaming server a media presentation description (MPD) describing live-stream media content composed of a sequence of segments and an information on a current segment of the sequence of segments, and a step 504 of commencing retrieving live-stream media content from the live-streaming server from a predetermined segment of the sequence of segments onwards which the client determined based on the information.

Figure 6:
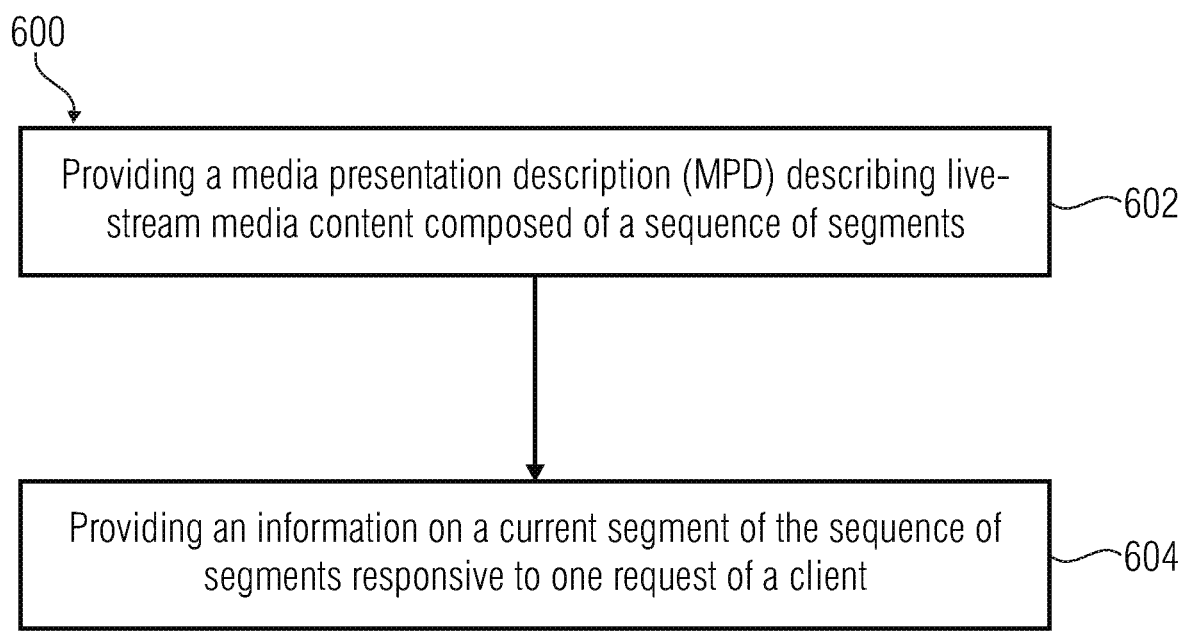
FIG. 6 shows a schematic block diagram of a method for operating a live-stream server.

FIG. 6 shows a schematic block diagram of a method 600 for operating a live-streaming server. The method 600 comprises a step 602 of providing a media presentation description (MPD) describing live-streaming media content composed of a sequence of segments, and a step 604 of providing an information of a current segment of the sequence of segments responsive to one request of a client.

It is to be understood that in this specification, the signals on lines are sometimes named by the reference numerals for the lines or are sometimes indicated by the reference numerals themselves, which have been attributed to the lines. Therefore, the notation is such that a line having a certain signal is indicating the signal itself. A line can be a physical line in a hardwired implementation. In a computerized implementation, however, a physical line does not exist, but the signal represented by the line is transmitted from one calculation module to the other calculation module.

Although the present invention has been described in the context of block diagrams where the blocks represent actual or logical hardware components, the present invention can also be implemented by a computer-implemented method. In the latter case, the blocks represent corresponding method steps where these steps stand for the functionalities performed by corresponding logical or physical hardware blocks.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive transmitted or encoded signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a non-transitory storage medium such as a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Client configured to retrieve a live-stream media content,
   wherein the client is configured to receive from a live-streaming server a media presentation description (MPD) describing live-stream media content composed of a sequence of segments and an information on a current segment of the sequence of segments, wherein the client is further configured to commence retrieving the live-stream media content from the live-streaming server from a predetermined segment of the sequence of segments onwards which the client determined based on the information
   wherein the client is configured to retrieve the live-stream media content using MPEG-DASH,
   wherein the client is configured to derive from the MPD a segment template signaling a computation rule for computing unique indices of the segments of the representation,
   wherein the segment template indicates a live streaming start-time of the sequence of segments and a mean temporal length of the segments of the sequence of segments.

2. Client according to claim 1, wherein the information on the current segment of the sequence of segments indicates the unique index of the current segment.

3. Client according to claim 1, wherein the information on the current segment is provided in the MPD or out of band.

4. Live-streaming server configured for providing a media presentation description (MPD) describing live-stream media content composed of a sequence of segments and further configured for providing an information on a current segment of the sequence of segments responsive to one request of a client,
   wherein live-streaming server is configured to provide the live-stream media content using MPEG-DASH,
   wherein the live-streaming server is configured to provide in the MPD a segment template signaling a computation rule for computing unique indices of the segments of the representation,
   wherein the segment template indicates a live streaming start-time of the sequence of segments and a mean temporal length of the segments of the sequence of segments.

5. Live-streaming server according to claim 4, wherein the information on the current segment of the sequence of segments indicates the unique index of the current segment.

6. Live-streaming server according to claim 4, wherein the information on the current segment is provided in the MPD or out of band.

7. A non-transitory storage medium storing thereon a Data stream comprising a media presentation description (MPD) describing live-stream media content composed of a sequence of segments, the MPD comprising an information on a current segment of the sequence of segments,
   wherein the live-stream media content is provided using MPEG-DASH,
   wherein the data stream comprises in the MPD a segment template signaling a computation rule for computing unique indices of the segments of the representation,
   wherein the segment template indicates a live streaming start-time of the sequence of segments and a mean temporal length of the segments of the sequence of segments,
   wherein the live-stream media content is provided using MPEG-DASH,
   wherein the data stream comprises in the MPD a segment template signaling a computation rule for computing unique indices of the segments of the representation,
   wherein the segment template indicates a live streaming start-time of the sequence of segments and a mean temporal length of the segments of the sequence of segments.

8. A non-transitory storage medium storing thereon a Data stream according to claim 7, wherein the information on the current segment of the sequence of segments indicates the unique index of the current segment.

9. Method to retrieve a live-stream media content with a client, the method comprising:
   receiving from a live-streaming server a media presentation description (MPD) describing live-stream media content composed of a sequence of segments and an information on a current segment of the sequence of segments; and
   commence retrieving the live-stream media content from the live-streaming server from a current segment of the sequence of segments onwards which the client determined based on the information,
   wherein the client retrieves the live-stream media content using MPEG-DASH,
   wherein the client derives from the MPD a segment template signaling a computation rule for computing unique indices of the segments of the representation, wherein the segment template indicates a live streaming start-time of the sequence of segments and a mean temporal length of the segments of the sequence of segments.

10. Method for operating a live-streaming server, the method comprising:
providing a media presentation description (MPD) describing live-stream media content composed of a sequence of segments; and
providing an information on a current segment of the sequence of segments responsive to one request of a client,
wherein the client retrieves the live-stream media content using MPEG-DASH,
wherein the client derives from the MPD a segment template signaling a computation rule for computing unique indices of the segments of the representation,
wherein the segment template indicates a live streaming start-time of the sequence of segments and a mean temporal length of the segments of the sequence of segments.

11. A non-transitory digital storage medium having a computer program stored thereon to perform the method to retrieve a live-stream media content with a client, the method comprising:
receiving from a live-streaming server a media presentation description (MPD) describing live-stream media content composed of a sequence of segments and an information on a current segment of the sequence of segments; and
commence retrieving the live-stream media content from the live-streaming server from a current segment of the sequence of segments onwards which the client determined based on the information,
when said computer program is run by a computer,
wherein the client retrieves the live-stream media content using MPEG-DASH,
wherein the client derives from the MPD a segment template signaling a computation rule for computing unique indices of the segments of the representation,
wherein the segment template indicates a live streaming start-time of the sequence of segments and a mean temporal length of the segments of the sequence of segments.

12. A non-transitory digital storage medium having a computer program stored thereon to perform the method for operating a live-streaming server, the method comprising:
providing a media presentation description (MPD) describing live-stream media content composed of a sequence of segments; and
providing an information on a current segment of the sequence of segments responsive to one request of a client,
when said computer program is run by a computer,
wherein the client retrieves the live-stream media content using MPEG-DASH,
wherein the client derives from the MPD a segment template signaling a computation rule for computing unique indices of the segments of the representation,
wherein the segment template indicates a live streaming start-time of the sequence of segments and a mean temporal length of the segments of the sequence of segments.

* * * * *